(12) United States Patent
Elvin

(10) Patent No.: US 11,021,035 B2
(45) Date of Patent: Jun. 1, 2021

(54) VEHICLE COOLING SYSTEM

(71) Applicant: Frederick Elvin, Oakland, MI (US)

(72) Inventor: Frederick Elvin, Oakland, MI (US)

( * ) Notice: Subject to any disclaimer, the term of this patent is extended or adjusted under 35 U.S.C. 154(b) by 269 days.

(21) Appl. No.: 15/885,977

(22) Filed: Feb. 1, 2018

(65) Prior Publication Data

US 2018/0229580 A1 Aug. 16, 2018

Related U.S. Application Data

(60) Provisional application No. 62/457,239, filed on Feb. 10, 2017.

(51) Int. Cl.
| | | |
|---|---|---|
| *B60H 1/00* | (2006.01) | |
| *F24F 13/28* | (2006.01) | |
| *F24F 13/08* | (2006.01) | |
| *F24F 7/013* | (2006.01) | |

(52) U.S. Cl.
CPC ..... *B60H 1/00257* (2013.01); *B60H 1/00378* (2013.01); *B60H 1/00521* (2013.01); *B60H 1/00828* (2013.01); *F24F 7/013* (2013.01); *F24F 13/085* (2013.01); *F24F 13/28* (2013.01)

(58) Field of Classification Search
CPC ...... B60H 1/00464; B60H 1/26; B60H 1/262; B60H 1/243; B60H 1/265; B60H 1/267; B60H 1/00828; B60H 1/00257; F24F 13/085; F24F 7/013
See application file for complete search history.

(56) References Cited

U.S. PATENT DOCUMENTS

| | | | | |
|---|---|---|---|---|
| 2,612,830 | A * | 10/1952 | Kendrick | F24H 3/0405 454/119 |
| 5,094,151 | A * | 3/1992 | Bernard | B60H 1/267 160/368.1 |
| 7,658,670 | B1 * | 2/2010 | Brown | B60H 1/267 454/124 |
| 2006/0258280 | A1 * | 11/2006 | Hagen | B60H 1/00428 454/69 |
| 2009/0096398 | A1 * | 4/2009 | Kyrtsos | H02P 1/04 318/432 |

* cited by examiner

*Primary Examiner* — Steven S Anderson, II
(74) *Attorney, Agent, or Firm* — Raggio & Dinnin, P.C.

(57) ABSTRACT

An in-vehicle fan system for use in a vehicle or home comprises a main body and a fan connected to the main body. The in-vehicle fan system further comprises a shroud arranged over the fan and connected to a first surface of the main body. A filter housing is connected to a second surface of the main body of the in-vehicle fan unit. The in-vehicle fan unit further comprises a first flange extending from or near a first end of the main body and a second flange extending from or near a second end of the main body. The in-vehicle cooling system may allow for the operator of the vehicle to cool the interior of the vehicle without running the engine of the vehicle.

15 Claims, 10 Drawing Sheets

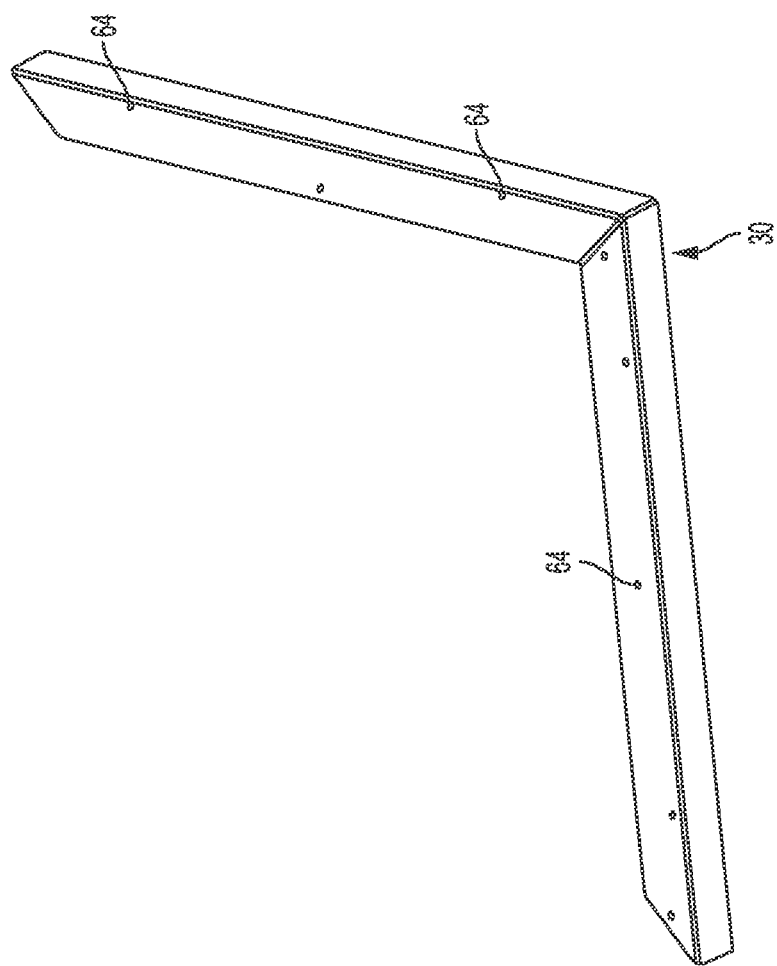

VEHICLE COOLING SYSTEM

This application claims the benefit of provisional application 62/457,239 filed Feb. 10, 2017.

BACKGROUND OF THE INVENTION

1. Field of the Invention

The invention generally relates to a vehicle cooling system and more particularly relates to a fresh clean cab air system that uses an in-window fan unit for semi-tractor sleeper trucks, commercial crew cab trucks and buses.

2. Description of Related Art

Semi-tractor sleeper trucks, commercial crew cab trucks and buses have been well known in the prior art. The users of these trucks generally experience a lot of down time due to federal trucking regulations that requires drivers have ten hours of rest after eleven hours of driving. These hours of down time are often done sitting in rest areas and truck stops with the truck engines running to provide power for cab air conditioning in order to keep the cab at a comfortable temperature while the ten hour rest time occurs. It should be noted that generally these trucks may use up to one gallon per hour per fan on diesel fuel to keep the truck cool. Many of these over the road truck drivers have experienced a failing air conditioning system in their truck which reduces the comfort and the economy of truckers over the road. The efficiency and profitability of the trucker is reduced because the truck engine has to be running in order to keep the truck at a comfortable temperature during the down time because the truckers are trying to provide fresh air to the cab and sleeping area of the truck.

Therefore, there is the need in the art for an in window fan unit for use with a semi-tractor sleeper truck, commercial crew cab trucks or buses that does not have to have the engine running in order to cool the interior of the cab and sleeping area to an appropriate temperature for comfort and economy of the truckers during their rest time. There is a need in the art for a window fan unit for a semi-tractor that runs on the 12 volt electrical system of the vehicle which limits engine noise, auxiliary power unit motor noise and reduces the number of unnecessary main engine hours. There also is a need in the art for an in-window fan unit that is capable of providing fresh air to the truck cab and sleeping area in both a high speed manner and a low speed manner to allow for appropriate noise levels for resting and sleeping by the trucker using the in-window unit fan. There also is a need in the art for an in-window fan unit that is capable of quickly cooling the cab and sleeper area of the truck and then having lower speeds on the fan to accommodate the trucker's preferences in keeping the cab at a certain temperature. There also is a need in the art for an in-window fan unit that may have a screen attached to the in window fan unit to keep insects out and is equipped with a HEPA filter that may remove pollen, dust and other air borne particles from the air entering the truck cab. There also is a need in the art for a low cost easy to manufacture in window fan unit for use in semi-tractor sleeper trucks that is not designed to be used while the vehicle is in motion, thus saving diesel fuel and other related costs for the over the road trucker.

SUMMARY OF THE INVENTION

One object of the present invention may be to provide an improved in window fan unit for a semi-tractor sleeper truck.

Another object of the present invention may be to provide an in window fan unit for use on a tractor trailer sleeper truck for use in cooling the cab of a tractor trailer while the vehicle is not in motion.

Yet another object of the present invention may be to provide an in window fan unit for a truck that runs on a twelve volt electrical system and limits engine noise, auxiliary power unit motor noise and reduces the number of unnecessary main engine hours of the semi-truck.

Still another object of the present invention may be to provide an in window fan unit that is designed to move air at a high speed providing fresh air to the cab and sleeping area of the truck.

Still another object of the present invention may be to provide an in window fan unit that uses a variable pulse modulated speed controlled motor on a fan that allows for the fan to operate at high speeds to cool the cab and sleep area and then operate at lower speeds to accommodate the trucker's comfort preferences during down time.

Still another object of the present invention may be that it provides an in-window fan unit for semi-tractor trailers that fits in both vented and non-vented doors of semi-tractor trailers.

Yet another object of the present invention may be that it provides an in window fan unit for semi-tractor trailers that may have a screen attached to the luvers to keep insects out while also being equipped with a hepa air filter that may remove pollen, dust and other air borne particles from entering the cab and sleeping area of the truck.

Another object of the present invention may be that it provides an in-window fan unit that may save diesel fuel and allow for fresh air to be circulated within the cab and sleeping area of a vehicle while the vehicle is not moving and the truck driver is taking the required federal rest time.

Still another object of the present invention may be that it provides an in-window fan unit that may be engaged between a top and bottom of a window opening on either a passenger or driver side of a semi-tractor trailer sleeper truck.

Yet another object of the present invention may be that it provides an in window fan unit that may have an adapter kit to arrange the in-window fan unit in doors that are ventless via a Velcro or any other hook and loop type fastener system.

Still another object of the present invention may be that it provides an in window fan unit that is easy to manufacture and install in a truck thus allowing for easy use and more efficiency through less diesel fuel being burned and limiting unnecessary main engine hours of a truck.

To achieve the foregoing objects and other advantages of the present invention, an in-window fan unit for use on a semi-truck sleeper cab is disclosed. The in-window fan unit has a main plate with a fan and the associated electronics connected thereto. The in-window fan unit also has a shroud arranged over the fan and secured to a surface of the main plate. A filter housing is secured to the main plate on a surface thereof. The filter housing may have a HEPA filter arranged therein. A vent cover may be arranged on an outer surface of the filter housing. The in window fan unit may be arranged within an open window on either the passenger or driver side of the semi-tractor trailer. The top end of the in fan unit engages with the rubber arranged at the top of the window frame of the door while the bottom portion of the in window fan unit engages with the window allowing for a snug and secure fit within the window opening of the semi-truck sleeper truck. The in window fan unit may allow for the vehicle, while it is not in motion, to cool and regulate the temperature of the cab without running the main engine and any auxiliary motors.

One advantage of the present invention may be that it provides a novel and improved in window fan unit.

Still another advantage of the present invention may be that it provides an in-window fan unit for use in semi tractor sleeper trucks, commercial crew cab trucks and buses.

Still another advantage of the present invention may be that it provides an in-window fan unit that runs on a twelve volt electrical system which limits engine noise, auxiliary power unit motor noise and also reduces the number of unnecessary main engine hours on the engine of the semi-tractor trailer.

Still another advantage of the present invention may be that it provides for an in-window fan unit that may operate both at a high speed to provide fresh air to the cab and sleeping area and also may operate at a lower speed to accommodate the trucker's comfort preferences during the required down time pursuant to federal regulations.

Still another advantage of the present invention may be that it provides an in-window fan unit that has an infinitely variable pulse modulated speed controlled motor that operates on twelve volts, thus allowing for operation of the fan at both high and low speeds.

Still another advantage of the present invention may be that it provides an in-window fan unit for semi-tractor trailers that fits in both vented and non-vented doors of semi-tractor trailers.

Yet another advantage of the present invention may be that it provides an in window fan unit for semi-tractor trailers that may have a screen attached to the lovers to keep insects out while also being equipped with a hepa air filter that may remove pollen, dust and other air borne particles from entering the cab and sleeping area of the truck.

Another advantage of the present invention may be that it provides an in-window fan unit that may save diesel fuel and allow for fresh air to be circulated within the cab and sleeping area of a vehicle while the vehicle is not moving and the truck driver is taking the required federal rest time.

Still another advantage of the present invention may be that it provides an in-window fan unit that may be engaged between a top and bottom of a window opening on either a passenger or driver side of a semi-tractor trailer sleeper truck.

Yet another advantage of the present invention may be that it provides an in window fan unit that may have an adapter kit to arrange the in-window fan unit in doors that are ventless via a Velcro or any other hook and loop type fastener system.

Still another advantage of the present invention may be that it provides an in window fan unit that is easy to manufacture and install in a truck thus allowing for easy use and more efficiency through less diesel fuel being burned and limiting unnecessary main engine hours of a truck.

Other objects, features and advantages of the present invention may become apparent from the subsequent description and the appended claims, taken in conjunction with the accompanying drawings.

BRIEF DESCRIPTION OF THE DRAWINGS

FIG. 10 shows a partial filter housing for use with an in-window fan unit according to the present invention.

DESCRIPTION OF THE EMBODIMENT(S)

Figure 1:
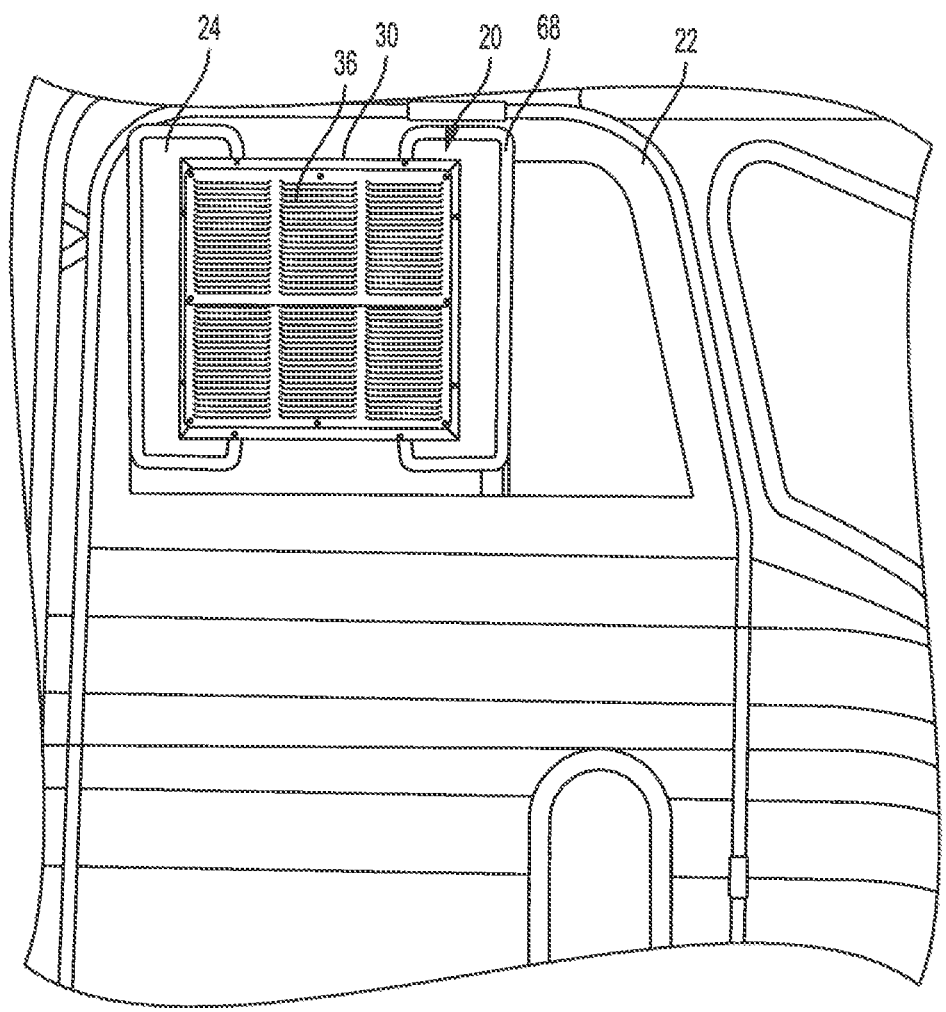
FIG. 1 shows an in-window fan unit arranged within a semi-tractor sleeper truck according to the present invention.
Figure 2:
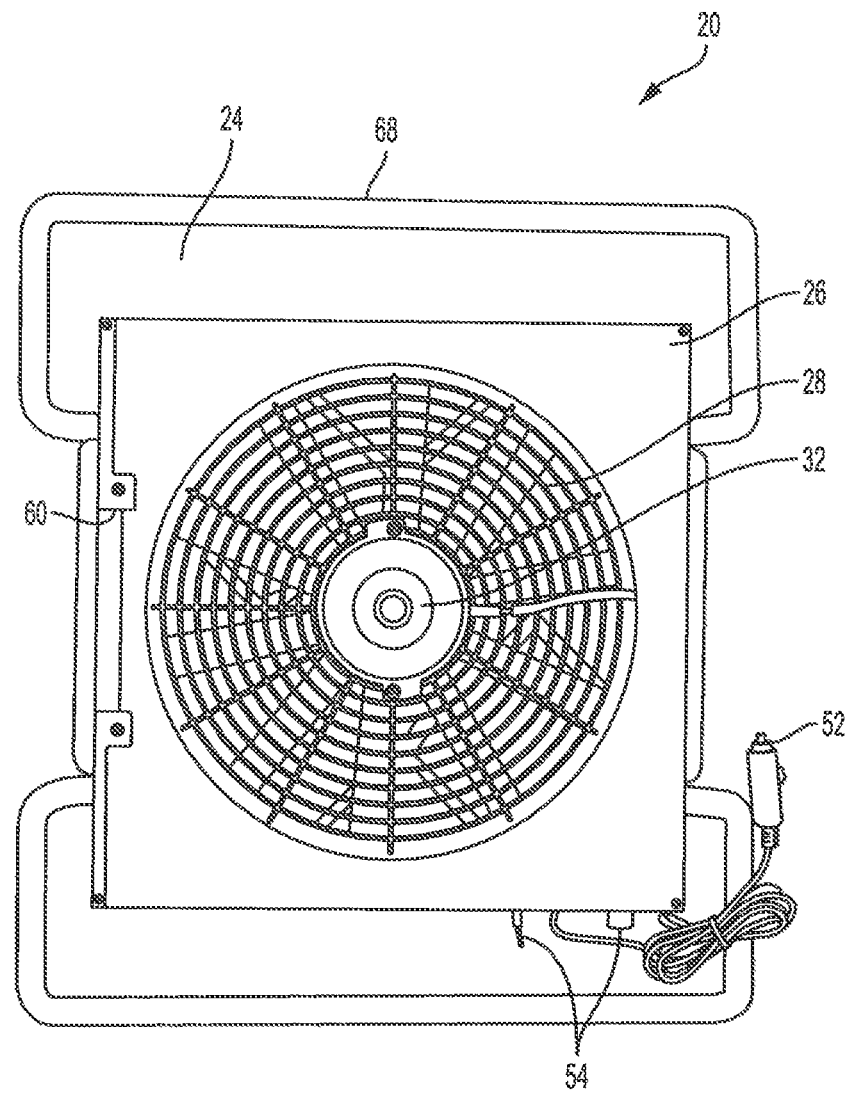
FIG. 2 shows a front view of an in-window fan unit according to the present invention.
Figure 3:
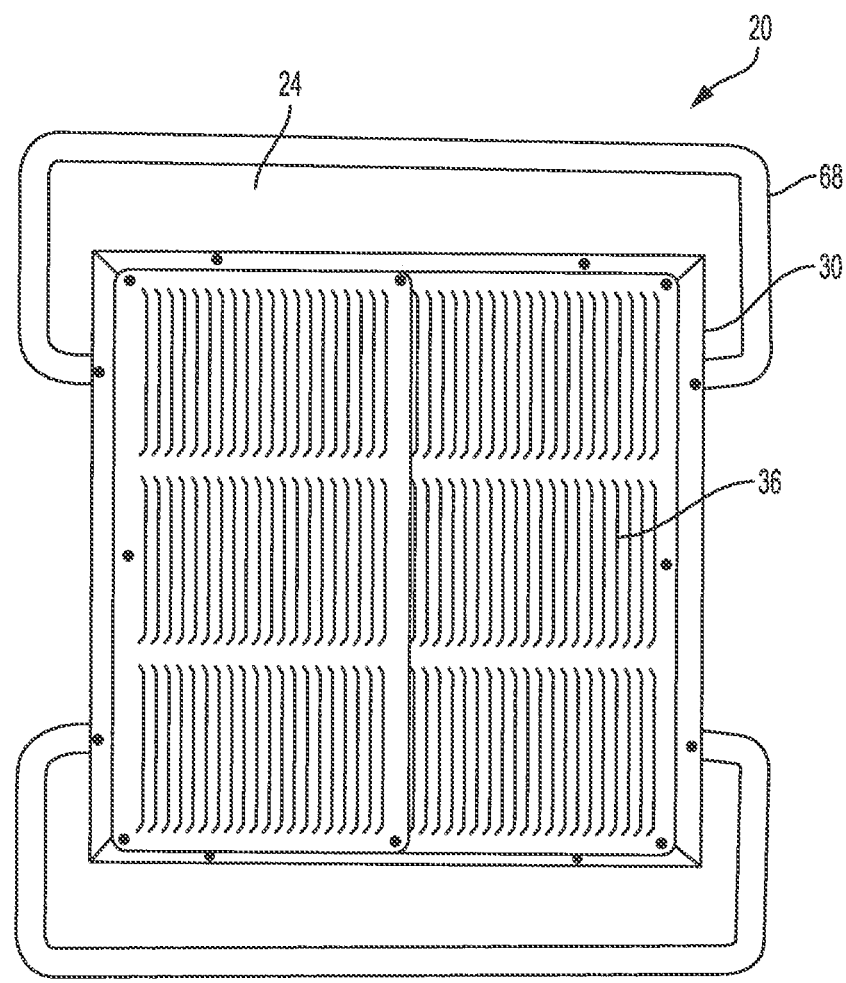
FIG. 3 shows a back view of the in-window fan unit according to the present invention.
Figure 4:
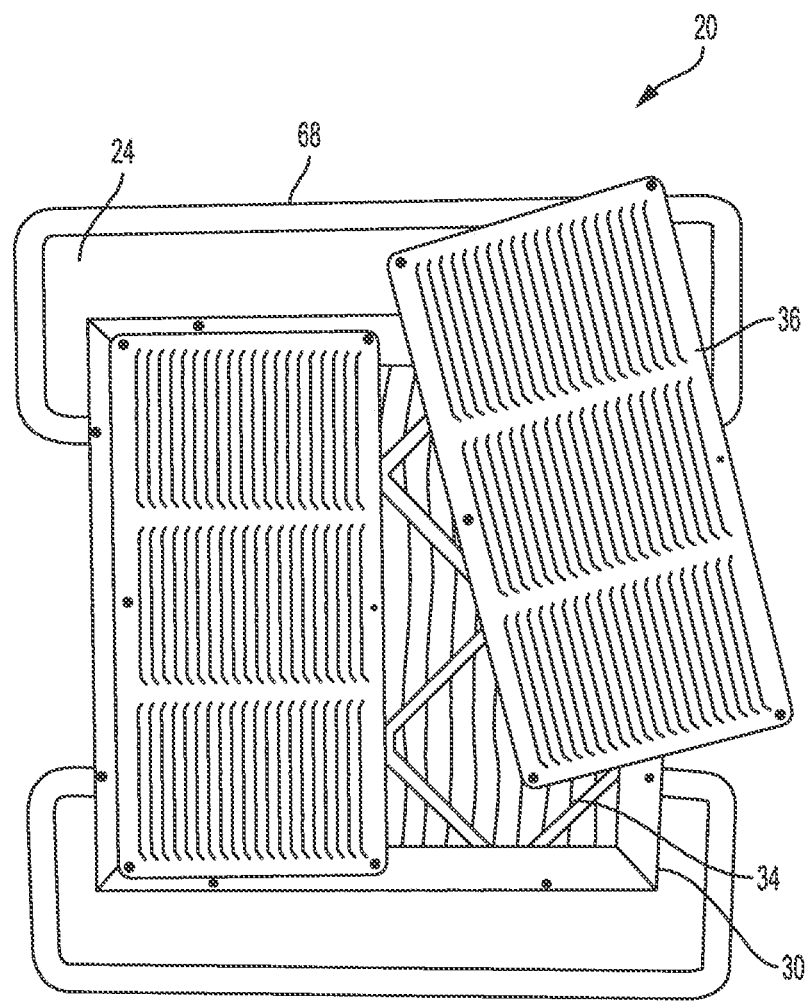
FIG. 4 shows a back view of the in-window fan unit according to the present invention.
Figure 5:
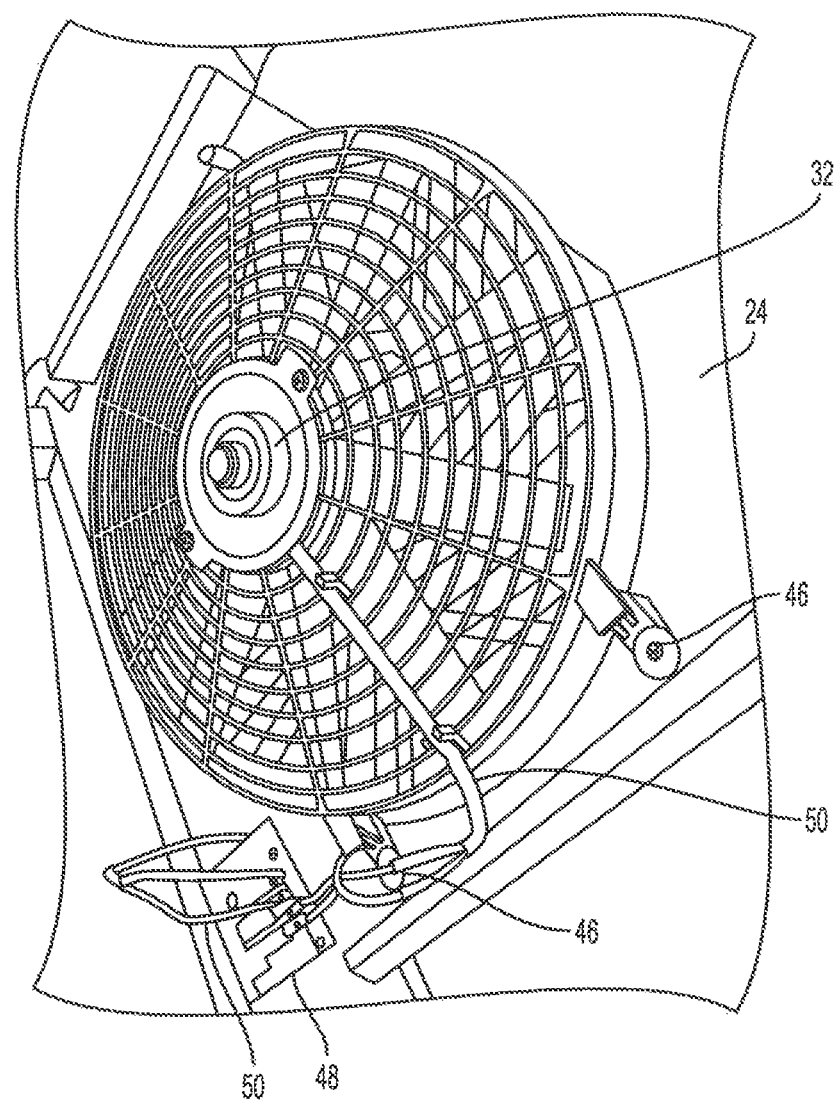
FIG. 5 shows a view of the fan connected to a main plate of the in-window fan unit according to the present invention.
Figure 6:
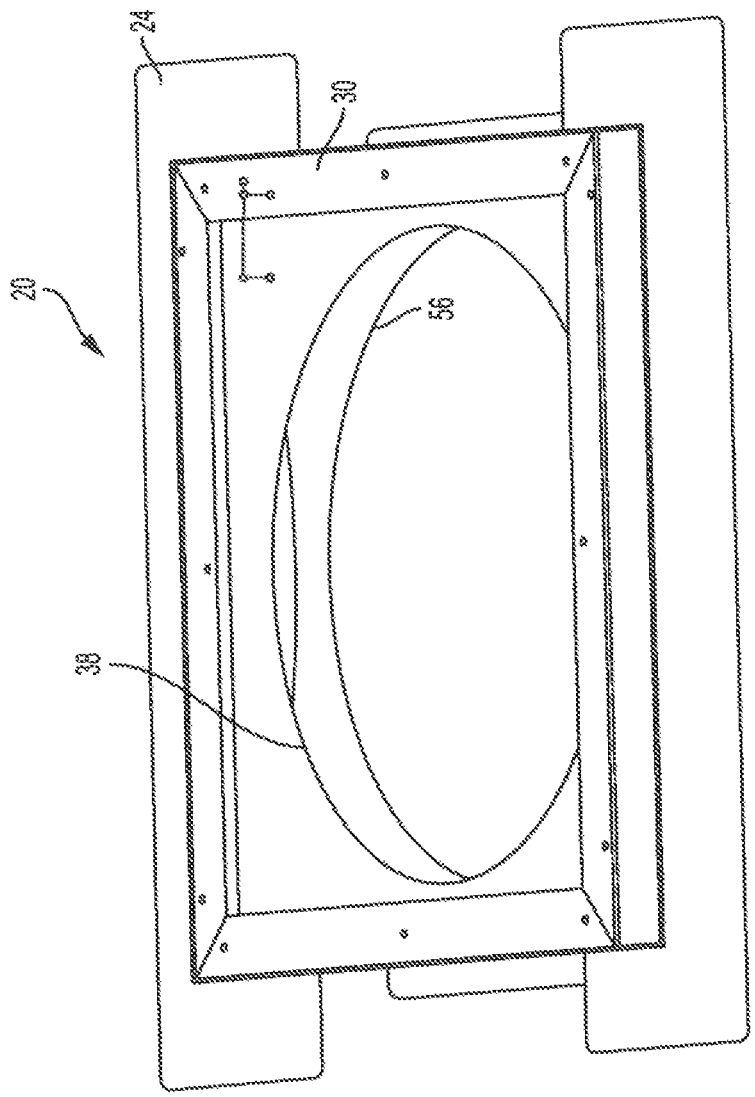
FIG. 6 shows a perspective view of the body of the in-window fan unit according to the present invention.
Figure 7:
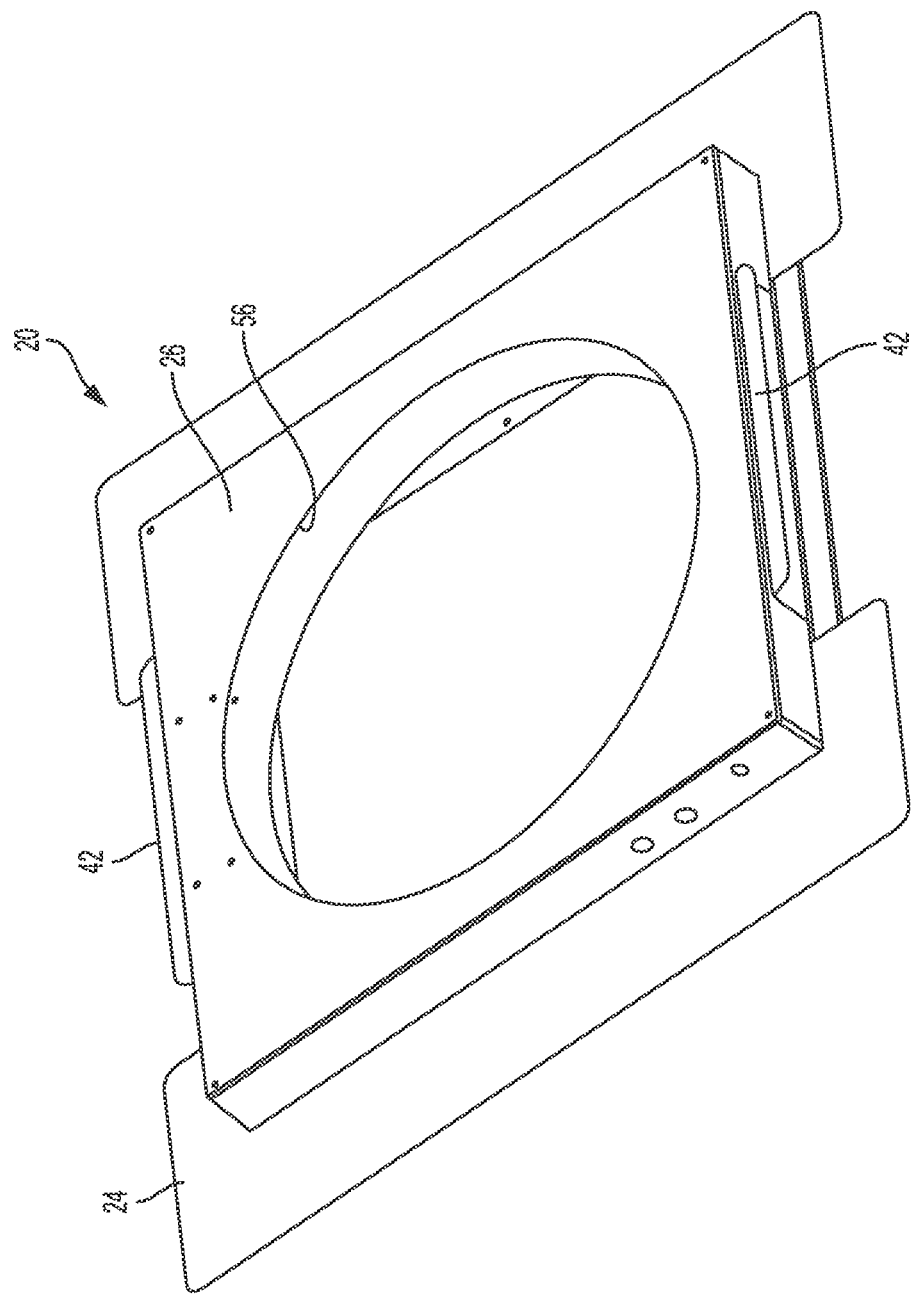
FIG. 7 shows a perspective view of the body of the in-window fan unit according to the present invention.
Figure 8:
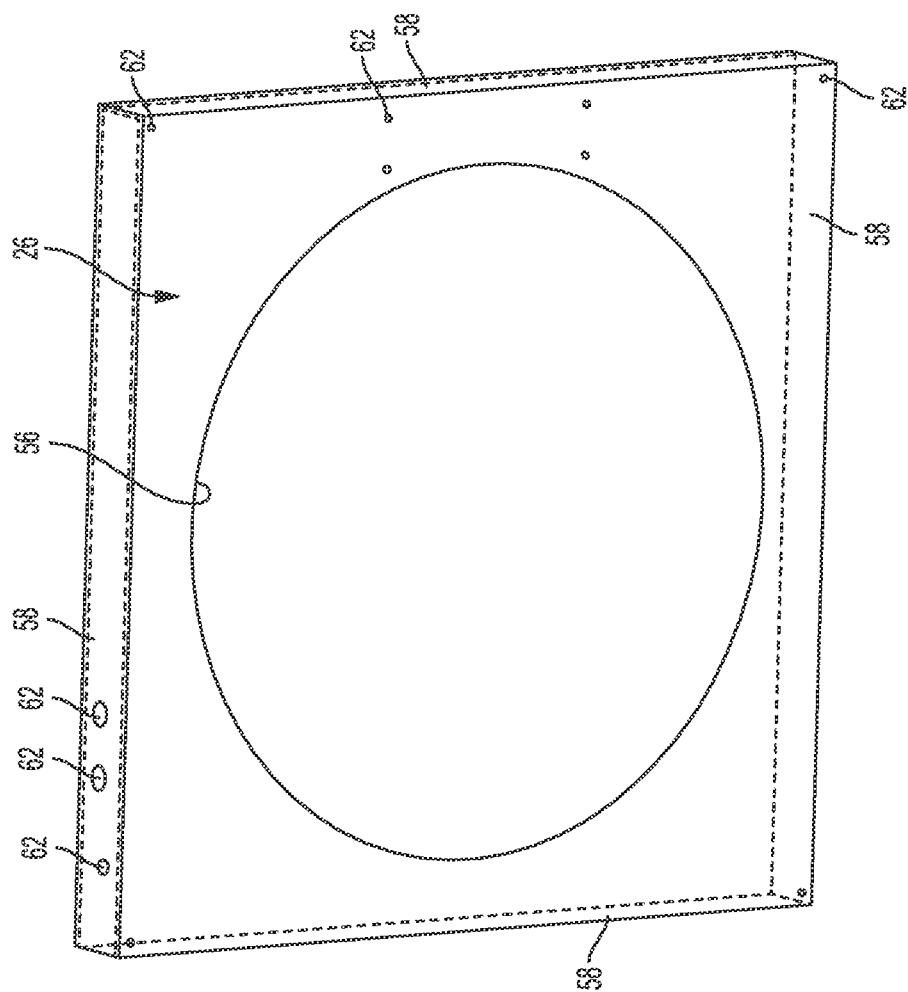
FIG. 8 shows a perspective view of a shroud for use with an in-window fan unit according to the present invention.
Figure 9:
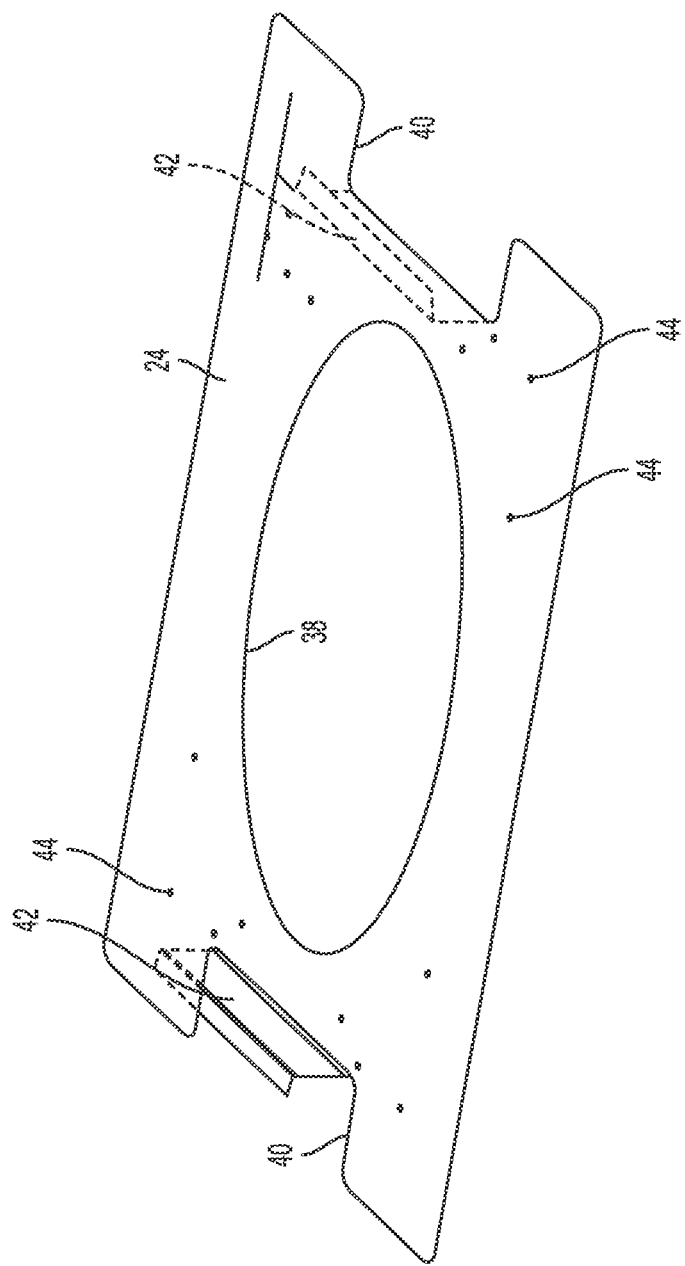
FIG. 9 shows a plan view of a main plate for use with an in-window fan unit according to the present invention.

Referring to the drawings, an in-window fan unit 20 for use in a semi-tractor sleeper truck 22 is shown. It should be noted that the in-window fan unit 20 may provide fresh clean cab air to the semi tractor sleeper truck, any other commercial crew cab truck or bus 22 or any other type of vehicle including but not limited to any type of road vehicle, marine vehicle, space vehicle, train, aerospace vehicle, etc. It should further be noted that the in-window fan unit 20 may also be used in ceilings, walls, floors, buildings, homes, structures, etc. The in-window fan unit 20 is designed with over the road truckers in mind. Many over the road truckers have experienced a failing air conditioning system within their truck 22 which affects the comfort and economy of truckers on the road. Furthermore, federal trucking regulations now require that drivers are required to have ten hours of rest after eleven hours of driving. Thus, truckers are experiencing many hours of down time, sitting in rest areas and truck stops with their engines running to provide power for cab air conditioning and the like. The in-window fan unit 20 of the present invention may save up to one gallon per hour per fan of diesel fuel which would be burned if the semi trucks air conditioning unit had to be run to provide a comfortable interior for the over the road trucker during the required ten hours of down time. It should be noted that the in-window fan unit 20 of the present invention is not for use while the vehicle 22 is in motion but is only for use during the required rest time when the truck 22 is stopped and parked at either a rest area, truck stop or the like. The in-window fan unit 20 of the present invention makes for an easy to attach and easy to install truck air cooling system that may save diesel fuel while also limiting noise from the engine, auxiliary motors and limit unnecessary main engine hours for the trucker thus increasing his efficiency and profit margin while on the road. It should be noted that the in-window fan unit 20 of the present invention is designed to fit in both vented and non-vented doors and may also include a screen attached to the lovers of the in-window fan unit 20 to prevent insects from entering the cab and it may also be equipped with air filters, such as a HEPA air filter, that may removed pollen, dust and other air born particles from entering the cab. It should be noted that the in-window fan unit 20 for semi-tractor sleeper trucks 22 generally is designed such that the sleeper area of the truck 22 may have the vents arranged therein, which when opened provides further circulation in conjunction with the in-window fan unit 20 to reduce the temperature and to increase the comfort within the sleeper area of the cab of the semi truck 22. It is also contemplated to have adaptor kits with the present invention in order to arrange the in-window fan unit 20 within doors that are ventless. These kits may use any type of hook and loop fastening system, such as Velcro, with one portion attached to the in-window fan unit 20 and the other portion of the hook and loop fastener attached to the inside door trim or other surface of the truck 22, thus allowing for the in-window fan unit 20 to be arranged within the window of the vehicle 22.

As shown in the drawings, an in-window fan unit 20 for use in a semi-tractor sleeper truck 22 or the like is disclosed. The in-window fan unit 20 generally includes a main plate 24, a shroud 26, a fan 28, and a filter housing 30. The in-window fan unit 20 also may include a variable speed motor on the fan 28 and the necessary electronics to operate the motor 32. As described above, a HEPA filter 34 may also be arranged within the filter housing 30 and a protective screen or vent cover 36 arranged and secured to an outer surface of the filter housing 30. It should also be noted that around the outer periphery of the main plate 24 may be arranged a seal 38 to ensure for a proper seal between the window opening and truck 22 and the in-window fan unit 20. It should be noted that any of the components of the in-window fan unit 20 are generally made of any type of material, including but not limited to, any type of metal, ceramic, composite, plastic, natural material or any other type of material that may be used to provide the exact features necessary and the required weight for the in-window fan unit 20 according to the present invention. It should also be noted that any type of fastener may be used including any type of mechanical or chemical fastener to secure the components of the in-window fan unit 20 to one another and to secure and arrange the in-window fan unit 20 within the window opening of the semi-tractor sleeper truck 22.

The in-window fan unit 20 according to the present invention includes a main plate 24 generally having a square shape. It should be noted that it is also contemplated that any other known shape may be used for the main plate 24, including but not limited to any known rectangular shape, circular shape, triangular shape, quadra angle shape or any other known or unknown shape and any random shape that is capable of being arranged within a window opening of a semi-tractor trailer truck 22. In one embodiment the main plate 24 may be made of a metal material. However, it should be noted that any other type of material, such as but not limited to any known composite, plastic, natural material, metal, ceramic or the like may be used for the main plate 24 according to the present invention. It should further be noted that the main plate 24 may have any known dimensions for both the vertical and horizontal portions of the main plate 24. The size of the main plate 24 may relate directly to the size of the window opening into which the in-window fan unit 20 may be arranged. Therefore, based on the overall size of the in-window fan unit 20 the main plate 42 may have any known length or width such as but not limited to between five inches to forty eight inches depending on the size of the window opening into which the in-window fan unit 20 may be arranged. In one contemplated embodiment, the main plate 24 may have a predetermined shaped orifice 38 arranged at a center or mid point thereof. The orifice 38 may be of any known shape, such as but not limited to a circular shape as shown in the drawings. Generally, this orifice 38 may mimic the shape of the fan 28 to be arranged on the main plate 24. Therefore, the orifice 38 may have any known shape, such as but not limited to any known triangular, square, oval, circular, rectangular, or any other known or random shape that is capable of being arranged within or near the middle of the main plate 24. In another contemplated embodiment, the orifice 38 may also include a solid circle plate at a midpoint thereof and a first, second, third and fourth arm arranged between the solid circle plate and an edge of the orifice 38. The arms may be arranged at 90° intervals from each other. Hence, the orifice 38 may, in this embodiment, be four separate orifices formed around a circle plate center. The main plate 24 may also include arranged at both a first end and a second end thereof a predetermined shaped notch or cutout 40. In one contemplated embodiment the notch 40 generally has a rectangular shape when viewed from the front. The notch 40 may extend a predetermined distance into the first edge and the second edge of the main plate 24 and it may have any other known shape other than rectangular, such as but not limited to any known square shape, triangular shape, circular shape, oval shape, semi-circular shape, or any other known shape. The notch 40 of the shown embodiment generally has a rectangular shape that extends a predetermined distance into the edge and extends a predetermined distance between the two inward extending edges to form the rectangular notch 40 on each edge thereof. Directly adjacent to the notch 40 and extending from the long edge of the notch 40 is a flange 42. The flange 42 extends from and is arranged off a surface of the main plate 24. It should be noted that a flange 42 extends from or near both ends of or edges of the main plate 24. The flange 42 generally may have a L-shape when viewed in cross section. The flange 42 may extend a predetermined distance away from an inner surface of the main plate 24, wherein it extends at generally a ninety degree or perpendicular angle from the inner surface of the main plate 24. It should be noted that it may extend at any other angle from the inner surface of the main plate 24, but in the embodiment shown it extends at a ninety degree angle. Arranged from a top edge of the flange 42 is an outward extending portion of the flange 42, thus forming a generally L-shaped cross section for the flange 42 of the main plate 24. A second flange 42 is arranged from the second end also from the inner surface of the main plate 24 as described above. The flanges 42 extend from the inner surface away from the main plate 24 then has a portion that extends in an outward direction towards the edge of the main plate 24, hence forming an outward extending L-shaped flange arranged on each end of the main plate 24 at the long edge of the notch 40 as described above. The first and second flange 42 may be parallel to one another. It should be noted that the flange 42 may be made by any known forming technique, such as bending of the metal or directly molding the flange 42 into the main plate 24 if a different material is used. The main plate 24 may also include a plurality of connecting orifices 44 arranged therethrough. The connecting orifices 44 may be used to secure the other components of the in-window fan unit 20 to the main plate 24, such as connecting orifices 44 used to help secure the fan 28 thereto, the electronics necessary to operate the fan 28 and for securing a shroud 26 and a filter housing 30 directly to the main plate 24 of the in-window fan unit 20. Therefore, these connecting orifices 44 may have any known size and shape and may be arranged in any known pattern depending on the other components used in the in-window fan unit 20.

The in-window fan unit 20 also may include a fan 28 connected and secured to an inner surface of the main plate 24 by any known fasteners. The fan 28 may have any known shape and size depending on the requirements and design of the in-window fan unit 20 and the truck 22 into which it may be used. In one contemplated embodiment as shown in the drawings, the fan 28 may have a circular shape and may have the necessary flanges extending therefrom in order to connect the fan 28 directly to the main plate 24 via any known fasteners 46. In the embodiment shown a screw and washer fastener set is used to connect the fan 28 directly to the inner surface of the main plate 24. However, it should be noted that any other type of mechanical or chemical fastening technique may be used to connect the fan 28 to the inner surface of the main plate 24. It should further be noted that the fan 28 as shown in the drawings is a circular fan, however any other shaped fan, such as but not limited to oval, square, circular, triangular, or any other known shaped fan housing and fan blades may be used in conjunction with the in-window fan unit 20 according to the present invention. In one contemplated embodiment the fan 28 may be capable on running on a twelve volt electrical system which may limit engine noise, auxiliary power unit motor noise and reduce the number of unnecessary main engine hours for the semi-truck. The fan 28 generally may also include a low voltage sensor arranged on a circuit board 48 thereof that may shut off the fan 28 when the battery voltage of the vehicle 22 reaches 11.5 volts, thus saving the battery from discharging and other damage. It should be noted that in one contemplated embodiment the fan 28 of the present invention is capable of moving two thousand cubic feet per minute of air at a high speed, thus providing fresh air to the cabin sleeping area. It should further be noted that the fan 28 of the present invention also may have an infinitely variable pulse modulated speed controlled motor 32 that operates on twelve volts and is capable of operating at both high speeds and low speeds. In one contemplated embodiment the fan 28 used in the present invention may have a fourteen inch diameter that draws 8.7 amps at high speed and 1.5 to 4 amps at lower speeds. However, it should be noted that any other type of fan 28 and any other sized fan other than that described above may also be used in conjunction with the present invention. It is also contemplated to have multiple fans arranged within the in-window fan unit 20 according to the present invention. The variable fan 28 may allow for the fan to be placed on high speed to cool the cab and sleeping area in a rapid manner and then allow for the trucker to dial down the fan 28 to a lower speed to accommodate the trucker's comfort preferences for cooling thereafter. Generally, the fan 28 is arranged and aligned in conjunction with the orifice 38 arranged through the main plate 24. The fan 28 may be arranged between the first and second flange 42 of the main plate 24 and within or aligned with the orifice 38 of the main plate 24, such that the fan 28 is aligned with the orifice 38 or directly over the orifice 38 to allow for air to move through the fan 28 and then through the orifice 38 from within the cab to the outside air or vice versa to move the air from outside the cab into the cab. The fan 28 may be arranged such that it is pulling air into the cab thus allowing the hotter air to escape through the open vents and the sleeper area to provide proper circulation within the truck or cab. The fan 28 may include all of the necessary components to operate the fan 28, such as a cover for the fan 28, the appropriate motor 32 and the appropriate electronics 48. The electronics may include a circuit board 48 which is arranged and secured to an inner surface of the main plate 42 by any known fastener including but not limited to any known mechanical or chemical fastening technique. It should be noted that the necessary wires 50 are arranged between the fan motor 32 and the circuit board 48. The necessary wiring is then also connected from the circuit board 48 through an extension cord or wire to an opposite end of the extension cord. In one contemplated embodiment a twelve volt adapter plug 52 is attached to the opposite end of the extension cord and may be placed into a cigarette lighter or other power point of the truck cab in order to provide the twelve volts necessary to operate the fan 28 of the in-window fan unit 20 according to the present invention. It should be noted that as shown in the drawings, a twelve volt adaptor 52 is attached to provide the necessary power to the fan 28, however a traditional plug may be used depending on the electrical sockets available within the engine cab. Furthermore, it should be noted that it is also contemplated to use a battery system on the unit 20 to provide the necessary power to operate the fan 28 according to the present invention, thus completely isolating the in-window fan unit 20 from any electrical power or energy needed from the truck and the associated components therein. It should be noted that a switch 54 that is capable of operating the fan 28 and adjusting the speed of the fan 28 may be arranged anywhere on either the main plate 24 or shroud 26 of the in-window fan unit 20 according to the present invention. The switch 54 may be any known switch, such as a rotating switch, a flip switch and there may be more than one switch, one to turn on the power and a second to adjust the speed of the fan 28 or a single switch may be used to control both. It should be noted that the switches 54 may be attached and secured to either the main plate 24 or the shroud 26 by any known mechanical or chemical fastening technique. It should further be noted that the fan 28 and the associated components may be made of any known material, such as plastic as shown in the drawings or any other known material such as but not limited to metal, ceramic, composites or natural materials may be used to make the switches, the fan, fan blades and the associated fan motor.

The in-window fan unit 20 also may include a shroud 26. In one contemplated embodiment, the shroud 26 generally has a square shape. However, it should be noted that the shroud 26 may have any other known shape, such as but not limited to any other known rectangular shape, triangular shape, circular shape, quadra angle shape, or any other known shape or random shape that is capable of complimenting and being attached to an inner surface of the main plate 24. The shroud 26 may be made of a metal material however it should be noted that it may be made of any other known plastic, ceramic, composite, or natural material depending on the design requirements. The shroud 26 may also include an orifice 56 arranged at generally a mid point or center thereof. The orifice 56 in one contemplated embodiment may be a circular orifice that may mimic that of the outer shape of the fan 28 attached to the main plate 24. Therefore, the orifice 56 may have any known shape other than the circular shape as shown in the drawings. The orifice 56 may have a shape that generally mimics the outer diameter or shape of the fan 28 which is attached to the main plate 24. The shroud 26 may also include side walls 58 arranged around the outer periphery of the main body of the shroud 26. Thus, the shroud 26 when viewed in perspective generally may form a pan like structure having an orifice 56 arranged at a middle thereof. The side walls 58 may extend a predetermined distance from a surface of the shroud body. In the embodiment shown in the drawings, the walls 58 generally may form a square shape. It should be noted that the walls 58 may form any other shape depending on the overall outer shape of the shroud 26. It is also contemplated that the walls 58 may be formed onto the shroud 26 by any known bending technique if the material is a metal, but is it also contemplated that any other known machining or forming technique, such as molding, may have the walls 58 directly molded into the shroud 26 during the manufacture thereof. The shroud 26 may be secured to the inner surface of the main plate 24 such that the shroud 26 covers the fan 28 wherein the top portion of the fan 28 may extend through the orifice 56 of the shroud 26 a predetermined distance. However, it is also contemplated that the fan 28 may sit completely within the orifice 56, such that no portion of the fan 28 extends therefrom. The shroud 26 is secured to the inner surface of the man plate 24 by any known fastener, such as a metal screw however any other type of mechanical or chemical fastening technique may also be used to secure the shroud 26 to the inner surface of the main plate 24. In one contemplated embodiment a fastener is at least arranged through each corner of the shroud 26 into the main plate 24, thus allowing for a complete and secure connection between the main plate 24 and the shroud 26. It should be noted that any number of fasteners may be used to secure the main plate 24 and the shroud 26 to one another. It is also contemplated to have a notch or handle 60 arranged in one edge of the shroud 26 for an easy carry handle of the in-window fan unit 20. It should be noted that the notch 60 may have a generally rectangular shape, but any other known shape may also be used for the notch 60. It is also contemplated that a handle 60 may extend from and be connected to the shroud body. Furthermore, it is also contemplated to have a plurality of connecting orifices 62 through a surface of the shroud 26, either through the walls 58 or the main surface thereof to allow for connection of the shroud 26 to the main plate 24 or of the appropriate switches and cords to be passed through the shroud 26 to allow for operation of the in-window fan unit 20 according to the present invention. It should be noted that these orifices 62 may have any known shape depending on the number and types of switches and cords that need to pass through from the circuit board which controls the operation of the fan 28 and the electrical system of the vehicle. It should be noted that any number of orifices 62 may be arranged through any of the walls of the shroud 26 and any other surface of the shroud 26 for purposes of connecting and arranging the shroud 26 with relation to the main plate 24 of the in-window fan unit 20.

The in-window fan unit 20 may also include a filter housing 30 arranged and secured to an outer surface of the main plate 24. Generally, the filter housing 30 may have a generally square shape, however it should be noted that any other known shape, such as but not limited to rectangular, circular, triangular, quadra angle, or any other known shape or random shape may be used for the filter housing 30. The filter housing 30 generally includes four members that are arranged and connected at each end thereof to one another to form a generally square filter housing 30. In one contemplated embodiment the ends of the members may have a predetermined angle thereon thus allowing for the formation of a square when the members are fit together as shown in the drawings. Generally, the filter housing 30 may have a first and second wall extending in an inward manner to form a pocket. The pocket may have the filter 34 arranged therein. It should be noted that any known material may be used for the filter housing 34. In the embodiment shown a metal material is used, however any other type of material, such as but not limited to any known plastic, ceramic, composite, or natural material may also be used to make the filter housing 30. It is also contemplated that the filter housing 34 may only have a first wall extending from a body, thus forming a generally L-shape when viewed in cross section. The filter housing 30 may also have a plurality of orifices 64 arranged therethrough that allow for fasteners to be placed through the filter housing 30 to secure the filter housing 30 to the outer surface of the main plate 24. Furthermore, some of these orifices 64 may be used to secure a cover or vent type member 36 over the outside surface of the filter housing 30. It should be noted that generally arranged within the pocket of the filter housing 30 may be a filter 34. In one contemplated embodiment a HEPA filter 34 is used within the in-window fan unit 20 in order to remove pollen, dust and other air born particles from entering the sleeper area of the sleeper cab. However, it should be noted that any other type of filter 34 other than a HEPA filter may be used for the present invention. Furthermore, it is contemplated to have the filter 34 arranged directly into the filter housing 30 or to have the filter housing 30 built around the filter 34 and secured to the main plate 24 after the filter 34 is arranged therein. It is also contemplated to have the filter housing 30 comprised of two V-shaped components that when placed together may form the outer square shape of the present invention filter housing 30. It is also contemplated that a plurality of metal screws may be used to secure the filter housing 30 to the outer surface of the main plate 24 and the same type of metal screws to secure the vent cover 34 to the outer surface of the filter housing 30. However, any other known mechanical or chemical fastening technique may be used to secure such components to one another. The filter housing 30 may be the portion of the in-window fan unit 20 that extends from the cab into the outside air while the inner surface and fan 28 may be arranged within the interior of the cab of the semi-truck trailer 22.

It should also be noted that it is contemplated to have a seal 68 arranged around the complete outer periphery of the main plate 24. As shown in the drawings, the seal 68 may be any type of seal, such as a rubber, plastic, etc., that has a channel arranged in one surface thereof, wherein the channel is arranged over the outer edge of the main plate 24 thus allowing for proper sealing to occur between the window opening and door surfaces and the in-window fan unit 20. It should be noted that the seal 68 may not be arranged on the portion of the main plate 24 that has the flange 42 arranged thereon. It should be noted that the seal 68 may have any known shape, cross section and may be made of any known material capable of providing the necessary seal between the surfaces of the truck and the in-window fan unit 20. The seal 68 may be secured to the main plate 24 via any known chemical or mechanical fastening technique.

In operation, the in-window fan unit 20 may be arranged between the glass at the bottom of the in-window fan unit 20 and the rubber insulation and/or window door seal and trim at the top thereof. The driver may park the semi-truck 22 in a rest area or truck stop and turn off the engine. The driver may then take the in-window fan unit 20 and after rolling down the passenger window of the vehicle install the in-window vehicle unit 20 therein. It should be noted that it is also contemplated that the driver may use the in-window fan unit 20 in the driver's window opening also or have one in both, the driver's window opening and the passenger window opening. The bottom flange 42 located on the main plate 24 may be arranged such that the flange 42 engages with a top portion of the window glass. The top portion of the in-window fan unit 20 may have the top flange 42 of the main plate 24 engage with either the rubber seal or trim of the window opening or the passenger door of the semi-truck trailer 22. The truck driver may then roll up the window such that the in-window fan unit 20 may be secured between the top portion of the window opening and the glass in a secure manner such that the in-window fan unit 20 may not fall from and not move around during use thereof. The in-window fan unit 20 may use the seal 38 arranged around the outer surface of the main plate 24 to engage with an outer surface of the truck, thus providing an air tight seal between the in-window fan unit 20 and the truck 22. It is also contemplated to use a screen in conjunction with the in-window fan unit 20 to ensure bugs and other insects do not enter the vehicle cab. It is also contemplated to have a screen arranged over the complete inner or outer surface of the in-window fan unit 20 to ensure bugs do not enter via any known orifices that are not readily sealed by the components described herein. It should be noted that the truck driver may or may not open the vents within the sleeper area to provide further circulation of the unit. After the unit 20 is installed within the window the truck driver may plug the power adapter 52 from the in-window fan unit 20 directly into the truck electrical system and then via the switches 54 turn on the fan 28 to either operate the fan 28 at high speeds or low speeds depending on the truck user's requirements. The fan 28 may allow for the truck 22 to be completely turned off such that no diesel fuel is being used and that the only power used is being drawn from the batteries and as described above the system may also include a low voltage sensor on the circuit board 48 that may automatically shut off the fan 28 when the battery voltage reaches 11.5 volts within the truck 22. This may ensure that the battery will not be completely drained thus compromising any ability to start and operate the tractor trailer truck as needed. The in-window fan unit 20 is easy to install and attach to the cab and provides for full engagement between the top and bottom of the fan unit 20 with the glass of the window and the rubber seals arranged at the top of the window opening and the door. It should also be noted that it is also contemplated to use adaptor kits for truck doors that are ventless. In this case, Velcro may be attached to the outer surface of the shroud 26 and then the opposite ends of the hook and loop material is arranged around the inside door trim or other truck surface via any known mechanical or chemical fastening technique, such as glue, tape or any other type of chemical fastener. Hence, the Velcro arranged on the shroud 26 of the unit 20 may be attached to the Velcro matching side arranged on the inside of the door trim of the door and secure the in-window fan unit 20 within the truck 22 thus allowing for ventless doors on semi-trucks to also use the present invention. It is also contemplated to use a plastic film arranged over the inside of the unit after the Velcro is attached thereto then the truck driver only has to turn on the fan and enjoy the fresh clean air which the in-window fan unit 20 provides to the inside of the truck without the truck engine running, thus saving gas while still cooling the inside of the truck for comfortable sleep or rest during the mandatory down time required for over the road truckers. It is also just as easy to remove the in-window fan unit 20 from the truck 22. The truck driver will unplug the system from the truck, roll down the window and disengage the bottom flange from the window, disengage the top flange from the rubber seal and molding of the window frame and remove the unit 20 and place in the truck during driving of the vehicle. In the case of the ventless doors, the truck driver would detach the film from the door trim and fan 28 and then remove the Velcro strips from one another leaving an unobstructive truck window therein. Therefore, it should be noted that the in-window truck fan 20 is only capable of use when the truck is parked and at a standstill and is not for use when the truck is moving.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A fan system for use in a vehicle or home, said fan system comprising:
    A main body, said main body having an orifice arranged at a center thereof, said main body having a first notch arranged at a first edge of said main body and a second notch arranged at a second edge of said main body, said first and second notches each having a rectangular shape and a long edge;
    A fan connected to a first surface of said main body;
    A shroud arranged over said fan and connected to said first surface of said main body;
    A filter housing connected to a second surface of said main body;
    A first flange extending from said first surface and the long edge of said first notch of said main body; and
    A second flange extending from said first surface and the long edge of said second notch of said main body.

2. The fan system of claim 1 further comprising a handle connected to said shroud.

3. The fan system of claim 1 wherein said first notch extends a predetermined distance into said first edge, said second notch extends a predetermined distance into said second edge, said long edge of said first notch extends between two inward extending edges of said first notch, said long edge of said second notch extends between two inward extending edges of said second notch.

4. The fan system of claim 1 wherein said main body is generally a plate having a generally square or rectangular shape.

5. The fan system of claim 1 wherein said first flange and said second flange having an L-shape when viewed in cross section.

6. The fan system of claim 5 wherein said first flange and said second flange extend perpendicularly from said main body, said first flange having a portion that extends from a top edge thereof in an outward direction towards said first edges of said main body, said second flange having a portion that extends from a top edge thereof in an outward direction towards said second edge of said main body.

7. The fan system of claim 1 further comprising a seal arranged around an outer periphery of said main body.

8. The fan system of claim 1 wherein said fan having a variable pulse modulated speed controlled motor.

9. The fan system of claim 1 wherein said fan is arranged between said first flange and said second flange, said first and second flange are parallel to one another.

10. The fan system of claim 1 wherein said shroud having a shroud body and side walls extending from an outer periphery of said shroud body.

11. The fan system of claim 10 wherein said shroud having an orifice arranged at or near a midpoint of said shroud body.

12. The fan system of claim 1 wherein said shroud is arranged between said first flange and said second flange.

13. The fan system of claim 1 wherein said filter housing having a plurality of members arranged and connected at each end thereof to form a predetermined shaped filter housing.

14. The fan system of claim 13 further comprising a filter arranged and held within said filter housing.

15. The fan system of claim 14 further comprising a vent cover secured to an outside surface of said filter housing.

\* \* \* \* \*